United States Patent [19]

Dombrowski et al.

[11] Patent Number: 4,836,011
[45] Date of Patent: Jun. 6, 1989

[54] ZERO AND SPAN ADJUSTMENT CIRCUIT FOR CURRENT/PRESSURE TRANSDUCER

[75] Inventors: Ferdinand Dombrowski, Marshalltown, Iowa; Dieter Forster, Haan, Fed. Rep. of Germany

[73] Assignee: Fisher Controls International, Inc., Clayton, Mo.

[21] Appl. No.: 119,836

[22] Filed: Nov. 12, 1987

[51] Int. Cl.⁴ .............................................. G01L 27/00
[52] U.S. Cl. ...................................................... 73/4 R
[58] Field of Search ................... 73/4 R, 1 R; 324/130, 324/74, 131; 364/571; 137/487.5, 82

[56] References Cited

U.S. PATENT DOCUMENTS

| | | | |
|---|---|---|---|
| 2,874,354 | 2/1959 | Bell | 324/130 |
| 3,222,599 | 12/1965 | Gewirtz | 324/123 |
| 3,408,570 | 10/1968 | Watters | 324/131 |
| 3,535,637 | 10/1970 | Goransson | 73/1 R |
| 3,617,881 | 11/1971 | McCormick | 324/57 |
| 3,697,871 | 10/1972 | MacMullan | 324/99 |
| 3,863,165 | 1/1975 | Egawa et al. | 330/2 |
| 4,037,154 | 7/1977 | Chamran et al. | 324/123 |
| 4,196,382 | 4/1980 | Bryzek | 73/726 |
| 4,315,211 | 2/1982 | Walsh | 324/123 |
| 4,332,175 | 6/1982 | Krainski, Jr. | 73/825 |
| 4,447,780 | 5/1984 | Youmans et al. | 324/132 |
| 4,465,075 | 8/1984 | Swartz | 73/708 |
| 4,481,967 | 11/1984 | Frick | 137/487.5 |
| 4,527,583 | 7/1985 | Simpson | 137/487.5 |
| 4,569,221 | 2/1986 | Snook, Jr. | 73/4 R |
| 4,630,631 | 12/1986 | Barnes | 137/82 |
| 4,665,938 | 5/1987 | Brown et al. | 137/487.5 |
| 4,705,067 | 11/1987 | Coffee | 137/487.5 |

Primary Examiner—Michael J. Tokar
Assistant Examiner—Robert R. Raevis
Attorney, Agent, or Firm—Marshall, O'Toole, Gerstein, Murray & Bicknell

[57] ABSTRACT

A zero and span adjustment circuit for current to pressure transducers. Current sources in parallel with the transducer bypass current around the transducer. One current source includes a variable resistor for adjusting the zero set point independently of the input current signal. The other current source includes a variable resistor for adjusting the span of the output pressure proportional to the input current signal. A feedback resistor couples a feedback signal from the transducer current to the other current source to vary the bypass current.

8 Claims, 1 Drawing Sheet

ZERO AND SPAN ADJUSTMENT CIRCUIT FOR CURRENT/PRESSURE TRANSDUCER

FIELD OF THE INVENTION

This invention relates to current to pressure transducers, and in particular to zero and span adjustment means in such transducers.

BACKGROUND OF THE INVENTION

In pipeline and process instrumentation, electronic control loops are often used to sense physical process variables and correspondingly actuate a control device such as a valve. Most analog or digital process control systems use currents variable between 4 and 20 milliamperes for the transmission of control signals or the control of field devices. Typically, a current to pressure transducer receives a 4 to 20 ma DC input signal from a controller and transmits a proportional 3 to 15 psig pneumatic output pressure to a final control element such as a control valve. Changes in ambient temperature, supply pressure changes, mounting positions, and other influences require that the current/pressure transducer zero set point and the input/output range or span of the transducer be adjusted in compensation for such influences.

Prior zero set point adjustment techniques utilized mechanical means such as the addition of a zeroing spring which acts on a pneumatic flapper-nozzle balance system to cause a desired compensating change in the output pressure. Other mechanical zero adjustments utilize changes in the nozzle position or by changing the torsion of flexure members to adjust the output pressure. Mechanical span adjustments also have been utilized involving a change in the position of a pressure feedback device or by means of a magnetic shunt. Another technique in span adjustment has been to use a potentiometer in parallel with the current carrying coil of the current to pressure transducer.

Such prior zero and span adjustment techniques require mechanical linkages to the current/pressure transducer; make remote adjustments difficult if not impossible; significantly deteriorate the system vibration performance; and require temperature compensation by thermistors which can only be an approximation for one specific resistance value of the prior art span adjusting potentiometer.

Accordingly, it is desired to provide zero and span adjustment means for a current/pressure transducer which do not require any mechanical linkages to the transducer, and if desired, can be installed remotely to the current to pressure transducer to thereby provide significant flexibility in the control loop system design.

SUMMARY OF THE INVENTION

In accordance with the principles of the present invention, there is provided a zero and span circuit in parallel with the current/pressure transducer to bypass a desired amount of current depending on the range of adjustment. The zero and span circuit includes two current sources in parallel. One of the current sources includes zero adjustment means for adjusting the level of the transducer input current to correspond to an adjustment of the zero setting of the output pressure. The second current source includes span adjustment means for adjusting the level of the transducer input current to correspond with adjusting the span of the output pressure in response to the input current.

Zero setting of the output pressure is independent of the value of the input current signal, while the span or range of the output pressure is proportional to the input current signal. The zero and span circuit further includes the feedback of a portion of the input current signal which flows through the current/pressure transducer so as to develop a proportional bypass current in one of the current sources. Adjustment of the zero set is provided by a variable resistor in one of the current sources. Adjustment of the span can be accomplished by varying a span resistor in one of the parallel current sources which responds to the feedback signal. Alternatively, span adjustment can be accomplished by varying a feedback resistor in the feedback input to the current source, or by providing a potentiometer to effectively enable varying of the span resistor and feedback resistor.

Utilizing the present zero and span circuit of this invention in a current/pressure transducer enables one to readily adjust the zero set and the span or range of the current/pressure transducer with electronic components. Accordingly, the zero and span circuit of the present invention can be installed remotely with respect to the current/pressure transducer to thereby provide a desired significant flexibility in system design.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
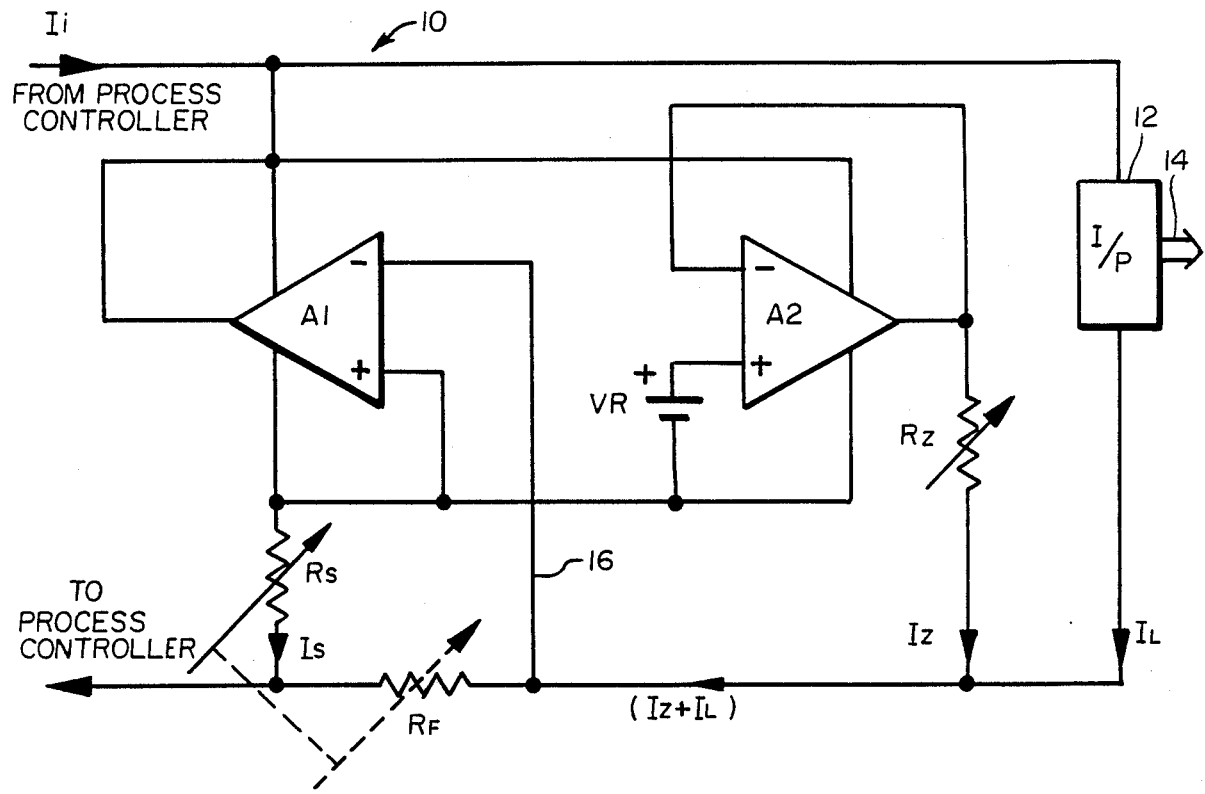
FIG. 1 is a schematic circuit diagram illustrating a zero and span adjustment circuit for a current to pressure transducer in accordance with the principles of the present invention.

Referring now to FIG. 1, there is illustrated a zero and span adjustment circuit 10 for a current/pressure transducer 12. The current/pressure transducer 12 receives an input current signal Ii from a process controller and develops a corresponding pressure output on line 14 to control for instance a control device or valve in the control loop. Typically, current/pressure transducer 12 receives a 4–20 ma DC input signal and transmits a proportional 3–15 psig pneumatic output pressure on line 14 to a final control element. Circuit 10 enables zero adjustment of the transducer output pressure to the desired 3 psig value when the input current signal is at 4 ma, and also enables adjusting the transducer output pressure to the full range of 15 psig when the input current signal reaches the full range of 20 ma. Other ranges of input current and corresponding output pressure may be used.

Circuit 10 includes operational amplifier A1 and A2 each of which shunts or bypasses some of the input current Ii around transducer 12. Amplifier A2 shunts current IZ through resistor RZ and away from the transducer. Similarly, amplifier A1 shunts a current IS through resistor RS and away from the transducer. The remaining current after the shunting effect of amplifiers A1 and A2 is designated as current IL flowing through transducer 12.

A feedback resistor RF is connected in the current path of current IL which flows through transducer 12 so as to develop a feedback voltage on line 16 which is connected to the negative terminal of amplifier A1. This feedback provides an input to amplifier A1 in response to the current through the transducer and thereby develops a corresponding bypass current in amplifier A1. A reference voltage VR is connected with its positive terminal to the positive input of amplifier A2 and with its negative terminal connected to the positive input of amplifier A1.

Input current Ii is supplied as a constant driving current from a process controller. It can be seen from FIG. 1 that the sum of the currents IS, IZ, IL, must equal the input drive current Ii. Furthermore, the voltage at both inputs of the high gain differential operational amplifiers A1 and A2 must essentially be equal. Using circuit analysis on FIG. 1, the following resulting equation can be obtained:

$$IL = \frac{RS}{RS + RF} Ii - \frac{VR}{RZ}.$$

From this equation it can be seen that the transducer current, IL, can be reduced by a constant amount VR/RZ. This is equivalent to a zero adjustment where the magnitude is controlled by appropriate adjustment of resistance RZ. Therefore, the "zero" current setting which corresponds to the zero setting of the transducer output pressure is independent of the value of the input current Ii of transducer 12. Also, from the above equation it can be seen that the transducer current, IL can be reduced by an amount proportional to the input current Ii. This is equivalent to a span or range adjustment where the magnitude is controlled by varying either resistance RS or resistance RF or a combination of resistances RS and RF.

Thus, in an initial calibration of the transducer, with an input current of 4 ma, zero adjustment resistor RZ is varied until the output pressure from the transducer on line 14 corresponds to 3 psig. Next, the input current is raised to 20 ma and the output pressure on line 14 should read 15 psig. If not, span resistor RS is adjusted until the output pressure corresponds to 15 psig. This initial calibration may be repeated until the output pressure from transducer 12 is within a desired accuracy range.

Alternatively, resistor RS may be a fixed resistor and the span adjustment may be obtained through a variable resistor RF shown in the dashed lines representing a variable resistor in FIG. 1. As a further alternative embodiment, both resistors RS and RF may be made variable and interconnected as illustrated by the dashed lines interconnecting the two variable resistors RS, RF, in FIG. 1, in order to adjust the span.

Figure 2:
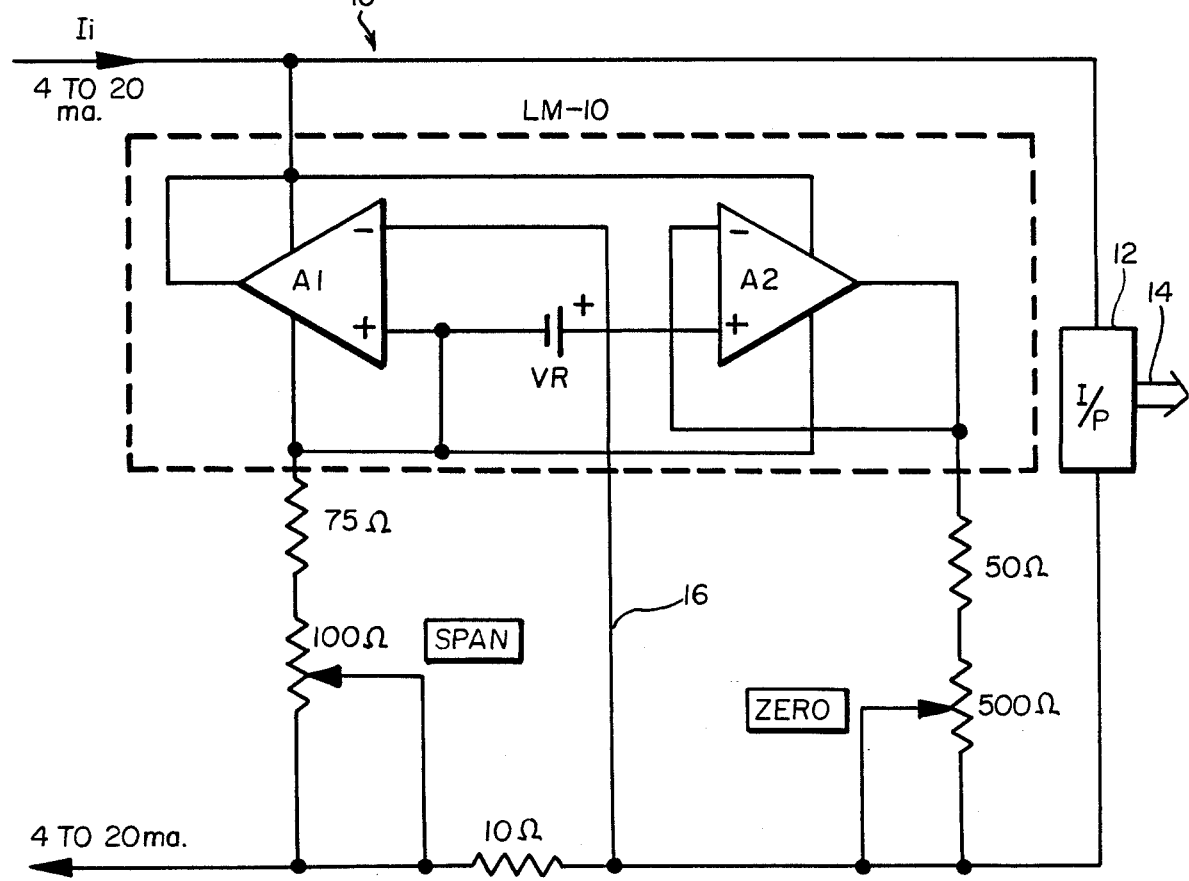
FIG. 2 is a schematic circuit diagram illustrating a practical embodiment of the invention utilizing an integrated circuit.

FIG. 2 illustrates a practical embodiment of the invention in which the two differential operational amplifiers A1 and A2 and the reference VR are contained on one integrated circuit. The illustrated integrated circuit LM-10 is available from a number of commercial sources. Furthermore, it may be noted in FIG. 2 that in comparison with FIG. 1, the span adjusting resistor RS and zero adjusting resistor RZ have been replaced by potentiometers with fixed resistors of 50 and 75 ohms included in series to limit the range of these adjustments.

It may be understood that further embodiments can be provided. As an example, a 20 ohm potentiometer may replace the 100 ohm potentiometer of FIG. 2, wherein one end of the 20 ohm potentiometer is attached to the 75 ohm resistor, the other end of the 20 ohm potentiometer is attached to the 10 ohm feedback resistor, and the potentiometer variable wiper is connected directly from the potentiometer back to the process controller. In such an embodiment, the span and feedback resistance are both varied to provide the span adjustment. In still another embodiment, the 20 ohm potentiometer described above can be connected as a variable resistor with the variable wiper of the potentiometer also being connected to the 75 ohm resistor and then being returned to the process controller.

The foregoing detailed description has been given for clearness of understanding only, and no unnecessary limitations should be understood therefrom, as modifications will be obvious to those skilled in the art.

What is claimed is:

1. In a current/pressure transducer for responding to an input current signal (Ii) and providing a corresponding output pressure, the improvement of a zero and span circuit for adjusting the zero setting of the output pressure and for adjusting the span of the output pressure in response to the input current signal, said improvement comprising:
   a first current source coupled to said input current signal;
   a second current source coupled to said input current signal;
   means for connecting said first and second current sources in parallel with each other and with said current/pressure transducer to bypass combined respective currents (IZ +IS) forming a first current portion (IZ +IS) of said input current signal (Ii) around said current/pressure transducer and to enable a second current portion (IL) of said input current signal (Ii) to pass through said current/pressure transducer;
   said first current source including zero adjustment means for adjusting the level of said respective current (IZ) and thereby of said second current portion (IL) to correspond with said adjusting of the zero setting of the output pressure; and
   said second current source including span adjustment means for adjusting the level of said second current portion (IL) to correspond with said adjusting of the span of the output pressure in response to the input current signal (Ii).

2. The improvement of claim 1, wherein said zero adjustment means includes means for adjusting said zero setting of the output pressure independently of the value of the input current signal.

3. The improvement of claim 2, wherein said span adjustment means includes means for adjusting said span of the output pressure proportional to the input current signal.

4. The improvement of claim 3, including means for splitting said first current portion (IS +IZ) between said first current source and said second current source.

5. The improvement of claim 2, wherein said zero adjustment means includes a first variable resistor for adjusting the zero setting of the output pressure.

6. The improvement of claim 5, wherein said span adjustment means includes a second variable resistor for adjusting the span of the output pressure in response to the input current signal.

7. The improvement of claim 6, including a feedback resistor coupled to said current/pressure transducer, and said first and second current sources to feedback to said second current source changes in the second current portion (IL).

8. The improvement of claim 7, including means for varying said feedback resistor to provide said span adjustment.

* * * * *